Figure 1:
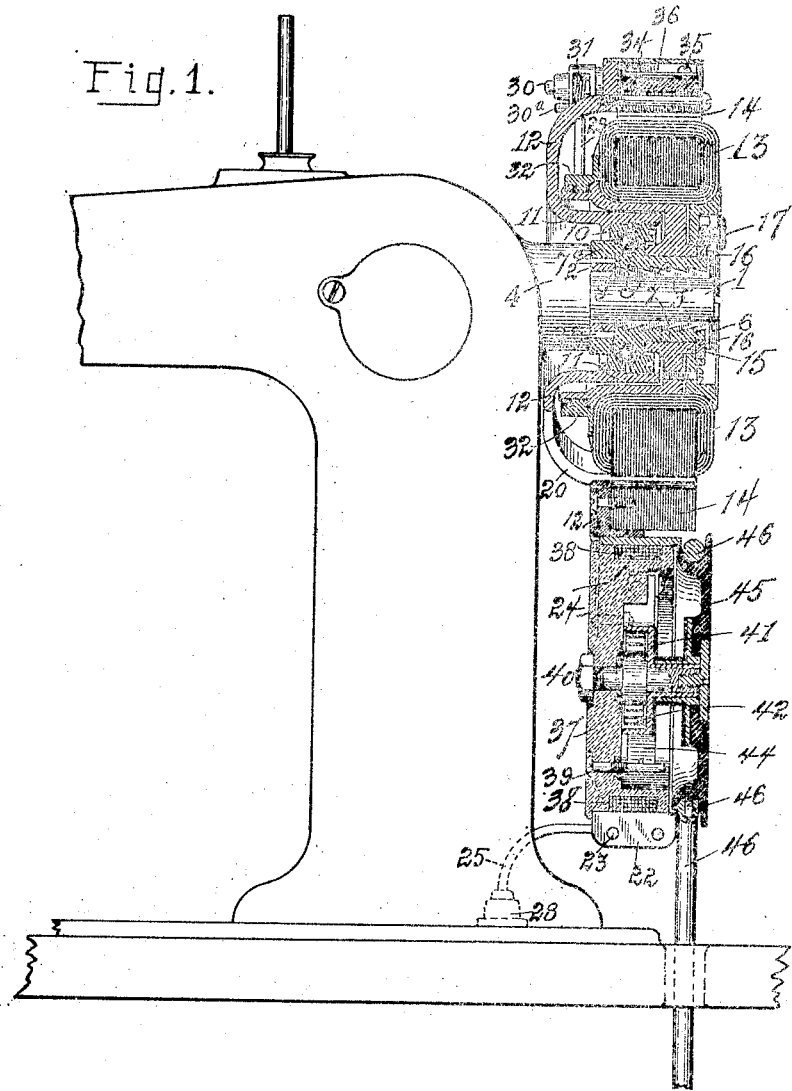

F. P. HUYCK.
SEWING MACHINE ELECTRIC MOTOR.
APPLICATION FILED JUNE 7, 1907.

985,678.

Patented Feb. 28, 1911.
3 SHEETS—SHEET 1.

WITNESSES:
D. C. Walter
Ada E. Cameross

INVENTOR:
Francis P. Huyck

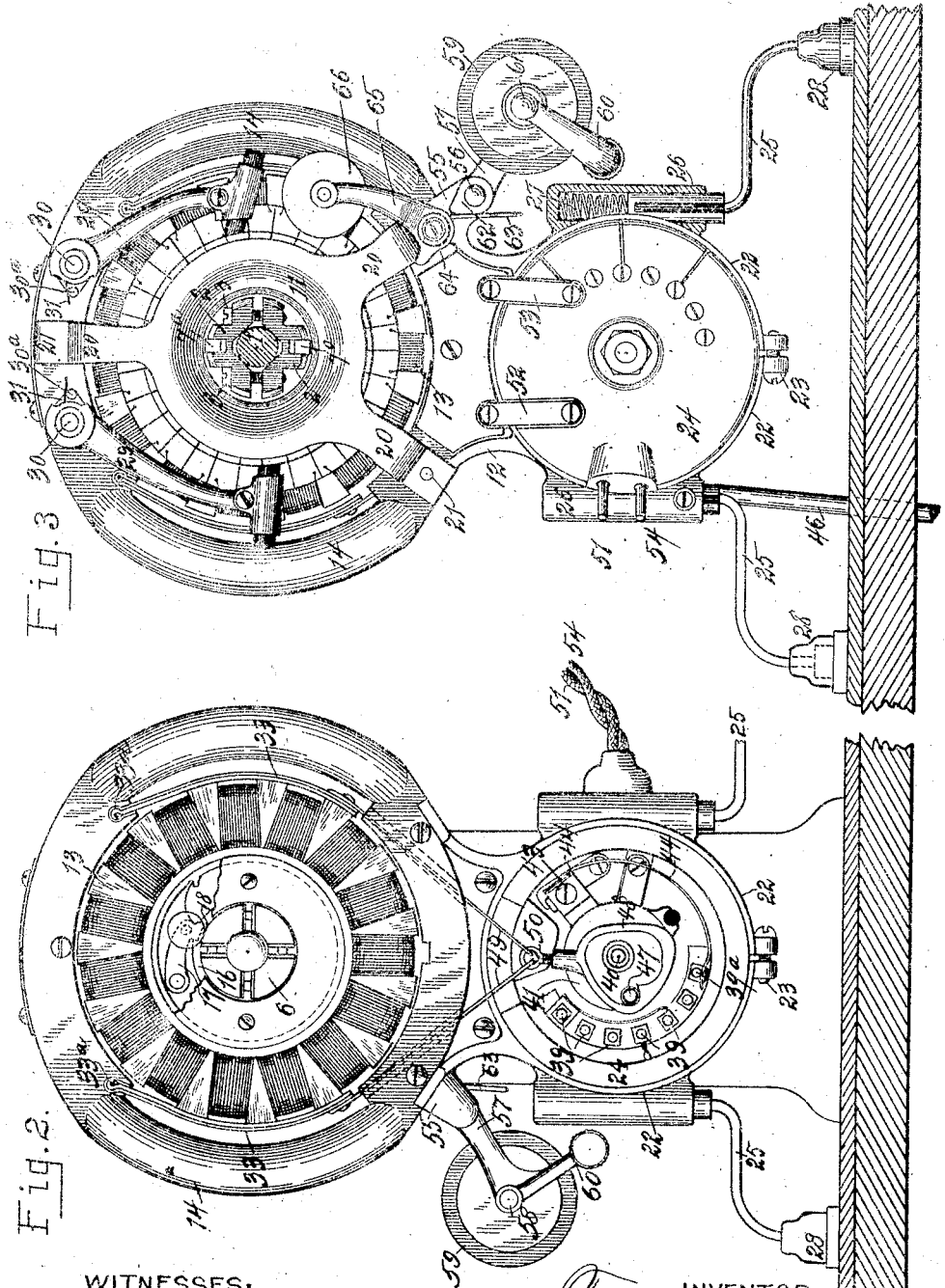

F. P. HUYCK.
SEWING MACHINE ELECTRIC MOTOR.
APPLICATION FILED JUNE 7, 1907.
985,678.
Patented Feb. 28, 1911.
3 SHEETS—SHEET 3.
Fig. 4.
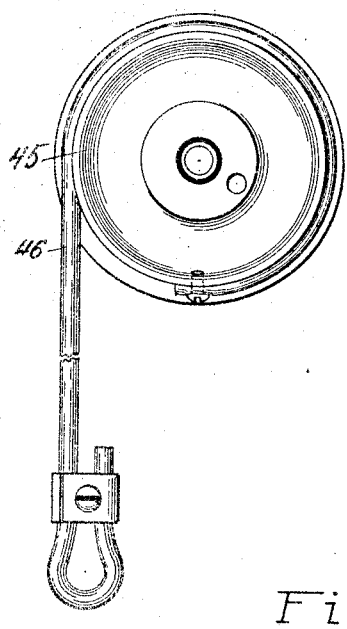
Fig. 5.
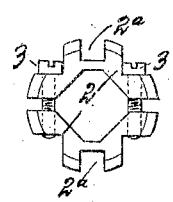
Fig. 6.
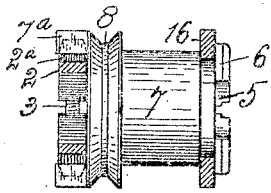
Fig. 7.
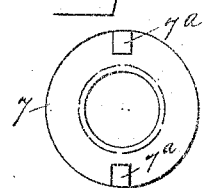
Fig. 8.
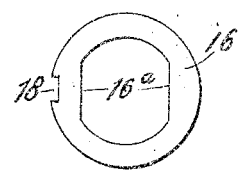
Fig. 9.
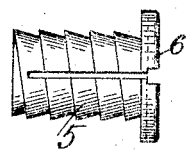
Fig. 10.
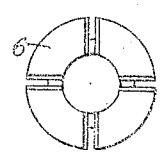
Fig. 11.
Fig. 12.
Fig. 13.
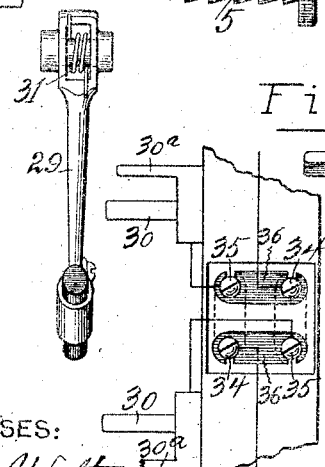
WITNESSES:
D. C. Walter
Ada E. Cameron
INVENTOR.
Francis P. Huyck
By Simon Hall, Atty.

UNITED STATES PATENT OFFICE.

FRANCIS P. HUYCK, OF TOLEDO, OHIO, ASSIGNOR TO EDWARD H. RHOADES, JR., TRUSTEE, OF TOLEDO, OHIO.

SEWING-MACHINE ELECTRIC MOTOR.

985,678.     Specification of Letters Patent.    Patented Feb. 28, 1911.

Application filed June 7, 1907. Serial No. 377,710.

*To all whom it may concern:*

Be it known that I, FRANCIS P. HUYCK, a citizen of the United States, residing at Toledo, in the county of Lucas and State of Ohio, have invented certain new and useful Improvements in Sewing-Machine Electric Motors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to electric motors for sewing machines, and its object is to furnish a motor which may readily and conveniently be directly connected with and operatively mounted upon the shaft of any of the sewing machines commonly in use, regardless of the considerable variations in the diameters of the shafts.

A further object of my invention is to provide a motor, rheostat and brake, assembled as a compact unit, capable of being applied by any unskilled person to any sewing machine without the use of tools, save a screw-driver, and of being controlled,—that is, started stopped and run at any desired speed,—by means of the treadle of the machine.

My invention is also designed to furnish a construction of motor rheostat and brake of such compact form that it shall occupy no more space than the ordinary hand-wheel and which may thus be employed in connection with any drop-head sewing machine and folded with the machine into its receptacle without necessitating the removal of the motor as has been necessary with sewing machine motors heretofore in use.

A further object of my invention is to provide a stopping and starting and braking device in which a single movement releases the brake and starts the motor, and in which the reverse movement, by which the brake is applied and the current is cut-off, is automatic.

I attain these objects by means of the devices and arrangement of parts hereinafter described and shown, and illustrated in the accompanying drawings, in which,—

Figure 1 is a central vertical sectional elevation of my device, mounted in operative relation to a sewing machine; Fig. 2, a front-elevation of the same with part of the central covering plate broken away to show the interior construction and with the cover of the rheostat hereinafter referred to, removed; Fig. 3, a rear-elevation of the same; Fig. 4, a rear-elevation of the controller-pulley hereinafter referred to, detached; Fig. 5, a side-elevation of the clamping-dog hereinafter referred to, detached; Fig. 6, a side-elevation of the radially adjustable compression-sleeve hereinafter referred to, detached, showing, in section, the parts illustrated in Figs. 5, 7, and 8; Fig. 7, an end-view of the outer member of the compression-sleeve; Fig. 8, a side elevation of the detent-ring hereinafter referred to; Fig. 9, a side elevation of the inner split member of the compression-sleeve; Fig. 10, an end-elevation of the same seen from the right in Fig. 9; Fig. 11, an edge-elevation of the brush-holder hereinafter referred to; Fig. 12, a side-elevation of the brush-holder stud hereinafter referred to, detached, and Fig. 13, a top-plan view of the connections hereinafter referred to, provided for causing the motor to run in either direction.

Like numerals of reference indicate like parts throughout the drawings.

In the drawings, 1 is the projecting end of a sewing machine shaft from which the hand-wheel has been removed. Upon this shaft is rigidly clamped a two-part dog 2 by means of clamping screws 3. This dog upon its inner side rests against the boss or bearing 4 upon the arm of the sewing machine and takes up and prevents longitudinal movement of the shaft. Upon the projecting end of the shaft 1 is slipped an externally threaded sleeve 5 the inner end of which abuts against the dog 2, the outer end having a head 6 recessed transversely for the reception of a wrench. The sleeve 5 is provided with a series of longitudinal slots extending from its outer end nearly to its inner end and with a series of corresponding alternating slots extending from its inner end nearly to its outer end. By reason of these slots the sleeve at both ends has considerable radial resiliency and both ends of the sleeve may be compressed to clasp as closely as may be desired the shaft upon which the sleeve is placed.

7 is an internally threaded sleeve the threads of which correspond with the external threads on the sleeve 5. The spiral ribs or threads upon the meeting surfaces of the sleeves 5—7 are oppositely beveled in transverse section in such fashion that when, by the rotation of the inner sleeve,—the outer sleeve being immovable,—these beveled surfaces are brought powerfully together, the resilient sleeve 5, is, by the wedge-like action of the inclined planes, compressed and caused to powerfully grip the shaft. During the rotation of the inner sleeve its end-travel is prevented by the head 6 coming in contact with the outer end of the sleeve 7, the inner end of which sleeve rests against the dog 2. The inner end of the sleeve 7 is provided with projecting lugs or fingers 7ª which project into notches 2ª in the dog 2. This dog being securely clamped upon the shaft of the machine and the sleeve being thus engaged with the dog, end motion of the sleeve and the parts supported thereon is prevented and the shaft and the dog must always rotate together. Around the outer surface of the sleeve 7 near its inner end is a groove or ball-race 8 in which is a series of anti-friction balls 9. These travel in an external two-part ball-race composed of rings 10 secured within the inner diameter of an extension hub 11 of the supporting frame or housing 12 as shown in Fig. 1, as will be hereinafter more fully explained. 13 is the armature or rotor of the motor and 14 is the field-magnet which, together with its poles, embraces the armature. The hub 15 of the armature slips loosely upon the external surface of the sleeve 7.

16 is a ring which fits upon the projecting extremity of the sleeve 7, the ring and sleeve having corresponding flattened portions, as at 16ª, which compel the rotation of both together. Pivoted upon the outer side of the hub of the rotor and within the annulus surrounding the shaft is a pawl 17 the free end of which has a tooth adapted to engage snugly a notch 18 in the edge of the ring 16. The head of the split sleeve 5 overlaps and holds the notched ring 16 against displacement. The inner and outer sleeves 5 and 7 being secured upon and revoluble with the shaft in the manner above described, the ring, the two sleeves, the dog 2, and the shaft are independent of the rotation of the armature which is loose upon the external sleeve, but if the pawl 17 be caused to engage the notch 18 in the ring 16, the armature and the shaft with the intervening parts must now revolve all together.

12 is a housing or frame the central hub of which carries in its interior the ball-races 10. The hub has radial arms 20 which engage and support the field magnet 14, as at 21. The lower part of the housing or frame 12 is extended downwardly in two curved arms 22 which meet at their lower ends these being adjustably secured together by means of clamping screw 23. The two curved arms each forming a semi-circle, provide a circular receptacle and support for a rheostat 24 which is clamped and secured in place between the arms by means of the clamping screw.

It will be seen that the housing or frame 12 is supported upon the ball-bearings 9—10 and that the frame and its load would, unless prevented, tend to revolve upon the shaft of the machine. To prevent this rotation and to hold the frame 12 and its burden stationary, notwithstanding the rotation of the armature and the shaft of the machine, I provide two arms 25, curved as shown, the upper vertical ends of these arms sliding in sockets 26 formed integral with the frame 12. In the sockets, abutting against their upper ends, are compression springs 27 which hold the arms pressed normally downward. At the lower end of the arms 25 are feet clad, as at 28, with soft rubber or other suitable substance and which rest upon the table or frame of the sewing machine. It will be seen that the elastic arms resting upon the table or other part of the sewing-machine-support not only overcome the tendency of the frame and its load to turn upon the shaft of the sewing machine but also take the greater part of the weight of the device from the ball-bearings.

When direct current machines are employed as, by way of illustration, in the present instance, the brush-holders 29 are pivoted upon studs 30 secured to the side of the field magnets. The arms 29 are provided with springs 31 which engage the arm and a stop 30ª fastened upon or integral with the stud 30, which springs hold the free ends of the brush-holders normally pressed inwardly toward and in elastic contact with the commutator. Each of the studs 30 is suitably insulated and forms a terminal for its appropriate winding in the field magnet.

The field magnets 14 are of laminated iron, the laminæ being of the form shown in Figs. 2 and 3. The field magnet being, as shown, eliptical in outline, there is left at each side of the circular armature a space for the windings of the field magnet, also an air-space and a recess for the brake-shoes 33 hereinafter to be described.

As my motor is designed to be used interchangeably with all sewing machines and since some sewing machine shafts revolve in a direction opposite to the movement of others, it becomes necessary to provide for the rotation of my armature in either direction. I accomplish this by means of the device illustrated in Fig. 13 in which 34 are the terminals of the field magnets. 35 the terminals of the armature, and 36 small copper links capable of being reversed as indicated by the dotted lines and thus communicating the current in a reversed direction to the brushes. The brush-holders 29 are of unequal length and are interchangeable on studs 30 so that the "lead" of the brushes may now, even by a novice, be quickly and conveniently changed at will to conform to the direction of the current and without further adjustment.

The rheostat clasped within the flexible semi-circular arms 22 of the frame 19 consists of a hollow spool 37, of porcelain or other non-conducting substance, about the periphery of which is wound a series of resistance-coils 38 connected respectively with contact-pins 39, the electric resistance decreasing through the series of contact-pins from right to left or clockwise. (See Fig. 2). Centrally of the spool is a stud 40 upon which is journaled a barrel 41 containing a coiled spring 42 one end of which is connected with the barrel, the other end being connected with the barrel-arbor. Projecting radially from the barrel is a lug 43 (see Fig. 2) to which is secured rigidly one end of a curved contact-spring 44, the other end being adapted to engage successively the resistance contact-pins 39. When the barrel is rotated on its bearings the free end of the spring 44 strikes successively the series of pins 39. The spring 42 holds the contact-spring 44 retracted and normally against idler-pin 39ª and out of circuit.

45 is a disk having a grooved periphery secured centrally to and revolving with the barrel 41. This disk forms both a pulley for rotating the barrel and a cover for the cavity of the spool 37 and its supporting ring 25—25. In the peripheral groove of the pulley 45 is secured one end of a flexible band 46 partly embracing the pulley and which leads and is secured to and is controlled by the treadle of the sewing machine or other suitable device for controlling the band 46 and its pulley 45. It will be seen that when the band 46 is drawn downwardly and unwound from the pulley, the pulley is rotated, carrying with it the barrel and the contact-spring, and that the contact-spring is thus quickly and surely moved into contact with either of the resistance-pins 39 as may be desired.

Projecting from the face of the barrel 41 is an insulated crank-pin 47 (see Fig. 2) which is engaged by a stirrup 48 which is connected with two metal bands or brake-rods 49 leading respectively to the lower ends of the brake-shoes 33 through suitable holes cut in the laminæ of the field magnets for this purpose. The brake-shoes are composed of flexible sheet metal and are secured at their upper ends, as at 33ª, to the inner side of the field magnet as shown. The brake-shoes are faced with leather or other suitable material. The metal of the brake-shoes 33 is resilient and forms springs which tend to hold the brake-shoes normally out of contact with the periphery of the armature. The connection between the stirrup and the brake-rods 49 is through a turn-buckle 50 which furnishes means for adjusting the tension between the brake-shoes and the crank-pin 47. It will be seen that when the pulley and barrel are rotated to move the contact spring 44 into contact with the various resistance-pins 39, the movement of the barrel, at the same time, releases the tension upon the brake-shoe springs in advance of the contact-spring's touching the first pin in the series, and permits the armature to revolve freely, and that, reversely, when the barrel is moved by its spring 42 into its normal position, the superior tension of the spring 42 overcomes the brake-springs and automatically sets the brakes upon the armature, instantly overcoming its momentum and stopping the machine. By means of the coöperating variable resistance and brake-mechanism here described the movement of the machine may be exactly controlled.

The course of the electric current is through inleading wire 51, through link 52 to the terminal of the winding of one side of the field magnet, (see Fig. 3,) thence to one of the terminals 34 of the field magnet, thence to the terminal of the appropriate brush through link 36, thence through the brush and commutator to the opposite side of the commutator, through the opposite brush to the other terminals 35 and 34—through the remaining link 36, thence through the windings of the opposite field magnet to its terminal, thence through link 53 to the contact-pin, in the rheostat, of lowest resistance in the series of pins 39, thence through the selected windings of the rheostat, through the contact-spring 44 and the arbor 40 through a link,—not shown in the drawings,—to the outleading wire 54.

55 is a lug formed upon the frame of the motor upon which is pivoted, as at 56, an arm 57 at the outer end of which is journaled, as at 58, a friction-wheel 59. The arm 57 carries a bracket 60 which is curved around the friction wheel 59 and the extremity of which lies in line with the axis of said friction-wheel. Between the axis of the friction-wheel and the extremity of the bracket 60 is interposed, as at 61, means for holding a bobbin-spool of the usual or any preferred construction. Upon the arm 57, surrounding pivot 56, is a boss 62 having a radial extension which contacts with a spring 63. Pivoted upon the frame of the machine, as at 64, is an arm 65 upon the upper end of which is journaled an idler 66. The friction-wheel 59 and the idler 66 lie in the same vertical plane. The arm 57 carrying the wheel 59 with its associated bobbin-holder may be swung upwardly bringing the wheel 59 against the idler 66 which in turn is forced against the peripheral surface of the commutator. The spring 63 engaging the irregular boss 62 holds the arm 57 and its load either in its elevated or depressed position. The armature being in motion with the idler in contact with the commutator and the bobbin-winder wheel 59 in contact with the idler, the bobbin-spool is revolved and may be wound in the usual manner. During this operation the pawl 17 may be disengaged from the notch 18 in the ring 16 so that now the armature revolves loose upon the sleeve 7 of the sewing machine which stands idle during the bobbin-winding operation.

From the foregoing description of my device the assembling and operation of the same will be understood without further explanation.

Some of the features of the devices herein described, are made the subject of my divisional application for Letters Patent of the United States, for controllers for electric motors for sewing machines, filed December 28th, 1907, Serial No. 408,338.

What I claim and desire to secure by Letters Patent is,—

1. In a sewing machine electric motor, a sewing machine shaft, a dog, means for rigidly securing the dog upon the shaft in longitudinally adjusted relation thereto, a sleeve upon the shaft, means for detachably engaging the sleeve and dog, an armature journaled upon the sleeve, means for detachably engaging the armature and sleeve in rotative relation, a frame revolubly supported upon the shaft, a field magnet surrounding the armature and supported by the frame, and means for holding the frame against rotation on its bearings.

2. In a sewing machine electric motor, a shaft, a sleeve detachably fixed upon the shaft, an armature upon and adapted to drive the shaft, a frame journaled upon and supported by the sleeve, a field magnet which embraces the armature and is carried by the frame, and means for holding the frame against rotation upon the shaft.

3. In a sewing machine electric motor, an armature adapted to be operatively engaged with a sewing machine shaft, a frame adapted to be rotatively supported upon such shaft, a field magnet surrounding the armature and supported by said frame, a rheostat supported by said frame, and means for preventing the movement of the frame upon its journal, said armature frame field magnet and rheostat being disposed in substantially the same plane.

4. In a sewing machine electric motor, an armature adapted to be operatively engaged with a sewing machine shaft, a frame adapted to be journaled upon such shaft, a field magnet embracing the armature and supported by the frame, a rheostat supported by the frame, and a brake mechanism for the armature, all of said elements being assembled and secured in operative relation as an organized machine, and means for detachably and operatively mounting such organized machine upon the shaft of a sewing machine.

5. In a sewing machine electric motor, an armature, a field magnet surrounding the armature, a brake-shoe interposed between the armature and field magnet and tensioned against frictional contact, and means for throwing the brake-shoe into frictional engagement with the periphery of the armature.

6. In a sewing machine electric motor, an armature, a field magnet surrounding the armature, a pair of brake-shoes at opposite sides of the armature interposed between the field magnet and the armature and tensioned against contact with the armature, and means for overcoming such tension and for holding the shoes normally in frictional contact with the periphery of the armature.

7. In a sewing machine electric motor, a frame, a field magnet supported by the frame, a shaft on which the frame is revolubly supported, an armature mounted upon the shaft, a commutator for the armature, a bobbin winder frame pivoted upon the frame first mentioned, a friction-wheel journaled in the bobbin winder frame, an arm pivoted upon the main frame, an idler journaled at the extremity of said arm and adapted to swing into and out of frictional engagement with the commutator, said friction-wheel being adapted to be thrown into and out of engagement with the idler, the arrangement being such that motion may be communicated from the commutator through the idler to the friction-wheel of the bobbin winder.

8. A sewing machine electric motor comprising an armature adapted to be supported upon a sewing machine shaft, a frame adapted to be rotatively supported upon such shaft, a field magnet carried by the frame and surrounding the armature, a rheostat carried by the frame, a brake mechanism carried by the frame, connections carried by the frame for actuating the rheostat and the brake mechanism in harmony, means carried by the frame for preventing its rotation on the shaft, a bobbin winder carried by the frame and adapted to be thrown into and out of frictional connection with the armature, and means for detachably connecting the armature in rotative relation to such shaft.

9. In a sewing machine electric motor, a frame, a sewing machine shaft upon which the frame is revolubly mounted, a field magnet secured to the frame, an armature mounted upon the shaft within the field magnet, coils upon the field magnet, coils upon the armature, pairs of terminals for the respective coils disposed adjacent to each other, and means for detachably connecting either member of one pair with either member of the other pair whereby the current through the armature may be caused to flow in either direction and whereby the reversal of the movement of the armature may be effected, combined with a pair of interchangeable brush-holders, of unequal length and supported by the frame and adapted by their interchange to reverse the lead of the point of commutation.

10. In a sewing-machine electric motor, a sewing machine shaft, an armature mounted upon and rotatively engaged with said shaft, a frame journaled upon such shaft, a field-magnet surrounding the armature and supported by said frame, a rheostat supported by said frame, and means for holding the frame from turning upon its bearings.

11. In a sewing-machine electric motor, an armature, a frame, a field-magnet, a rheostat, and a brake-mechanism, all of said elements being assembled and secured in operative relation as a unitary structure, and means for detachably engaging such structure with the shaft of a sewing-machine, comprising a dog adapted for rigid engagement with the shaft, and means for operatively connecting the armature with said dog.

12. In a sewing-machine electric motor, an armature, a frame, a field-magnet, a rheostat, and a brake-mechanism, all of said elements being assembled and secured in operative relation as a unitary structure, means for detachably engaging such structure with the shaft of a sewing-machine, comprising a dog adapted for rigid engagement with the shaft, means for operatively connecting the armature with said dog, and means for holding the frame against rotation upon such shaft.

13. In an electric motor, the combination with a commutator, of a wheel frictionally contacting with said commutator, and mechanism driven thereby.

14. In an electric motor, the combination with a commutator, of a wheel adjustable toward and from the periphery of said commutator, and an intermediate wheel normally out of contact with said commutator and in the path of said adjustable wheel adapted to be pressed by the latter into driving contact with the commutator.

15. The combination with an electric motor, of a brake arranged intermediate the rotor and stator thereof and engaging the surface of the rotor.

16. The combination with an electric motor, a rotor, an annular stator surrounding said rotor, a segmental brake shoe intermediate said rotor and stator and in the space between the poles of the stator, one end of said shoe being anchored to the stator poles and an operating connection for said shoe extending tangentially therefrom through a recess in said stator.

17. An electric motor comprising a hollow spindle, a rotor and a stator mounted thereon and in the same plane, and an annular member secured to said rotor projecting beyond the end of said hollow spindle.

18. An electric motor comprising a field magnet and an armature arranged in the same plane, one within the other, the one constituting the stator and the other the rotor, a hollow spindle for detachably mounting upon the shaft to be driven arranged concentrically within said field and armature, mountings for said rotor and stator journaled upon said hollow spindle adjacent to each other and within the space inclosed by the inner member, radial extensions from one of said mountings at one side of said inner member for supporting the outer member and a clutch located in the space within the inner member for coupling the rotor to said hollow spindle.

19. An electric motor comprising a frame having two eccentric annular portions, a rotor journaled within one of said annular portions of the frame, a stator mounted on said frame concentric with said rotor and controlling mechanism for said motor mounted within the other annular portion of said frame.

20. The combination with an electric motor and a control mechanism therefor organized as an operative unit, said control mechanism comprising a rheostat, a controlling switch therefor, and a mechanical brake for the rotor of said motor, said control mechanism and motor being arranged in the same plane, and means for mounting said unit upon the shaft to be driven.

21. The combination with an electric motor comprising a rotor and a stator, of an adjustable bushing for attaching said motor to the member to be driven thereby, said bushing being adjusted by a rotation thereof in relation to the rotor of said motor and means for locking said rotor to said stator during said adjustment.

In testimony whereof I affix my signature in presence of two witnesses.

FRANCIS P. HUYCK.

Witnesses:
L. A. ALEXANDER,
H. HAUDENSCHILD.